United States Patent
Salisbury

[19]

[11] Patent Number: 5,917,775

[45] Date of Patent: *Jun. 29, 1999

[54] APPARATUS FOR DETECTING THE DISCHARGE OF A FIREARM AND TRANSMITTING AN ALERTING SIGNAL TO A PREDETERMINED LOCATION

[75] Inventor: Gary Steven Salisbury, Jacksonville, Fla.

[73] Assignee: 808 Incorporated, Jacksonville, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/597,704

[22] Filed: Feb. 7, 1996

[51] Int. Cl.$^6$ .................................................. G01S 15/00

[52] U.S. Cl. ........................ 367/93; 367/906; 340/531; 340/540; 340/552; 379/39

[58] Field of Search ................... 340/323 R, 573, 340/686, 531, 540, 552, 573.1, 656.6; 379/39; 367/93, 94, 906, 135, 124

[56] References Cited

U.S. PATENT DOCUMENTS

| | | | |
|---|---|---|---|
| H1356 | 9/1994 | McCormick et al. | 89/1.6 |
| 2,925,582 | 2/1960 | Mattei et al. | 367/906 |
| 2,962,696 | 11/1960 | Snyder | 367/129 |
| 3,268,856 | 8/1966 | Wallen, Jr. | 367/906 |
| 3,341,810 | 9/1967 | Wallen | 367/124 |
| 3,445,807 | 5/1969 | Hirschberg | 367/135 |
| 3,445,808 | 5/1969 | Johnson | 367/906 |
| 3,739,368 | 6/1973 | Stalp | 340/323 R |
| 3,936,822 | 2/1976 | Hirschberg | 340/527 |
| 4,282,453 | 8/1981 | Knight et al. | 310/335 |
| 5,023,847 | 6/1991 | Lee | 367/136 |
| 5,455,868 | 10/1995 | Sergent et al. | 381/56 |
| 5,504,717 | 4/1996 | Sharkey et al. | 367/124 |
| 5,586,086 | 12/1996 | Pernuy et al. | 367/127 |

*Primary Examiner*—Benjamin C. Lee
*Attorney, Agent, or Firm*—Lott & Friedland, P.A.

[57] ABSTRACT

An apparatus for detecting the discharge of a firearm and transmitting an alerting signal to a predetermined location. The invention provides for detection circuitry having: (1) a microphone for detecting pre-set sensitivity levels, (2) a measuring means for measuring acoustic energy generated from the discharge of the firearm, resulting in acoustic energy information, (3) transferring means for transferring the acoustic energy information to a digital signal processor, which converts the acoustic energy information into digital format, resulting in digitized binary codes, (4) an analyzing means for comparing the digitized binary codes contained in the digital signal processor with a set of predetermined criteria, (5) a verification process, and (6) an alerting means for transmitting an alerting signal to a predetermined location in the event the digitized binary codes match the set of predetermined criteria.

19 Claims, 3 Drawing Sheets

APPARATUS FOR DETECTING THE DISCHARGE OF A FIREARM AND TRANSMITTING AN ALERTING SIGNAL TO A PREDETERMINED LOCATION

FIELD OF THE INVENTION

This invention relates generally to a detection system, and more specifically, this invention relates to a system capable of detecting the discharge of a firearm and transmitting an alerting signal to a predetermined location of the discharge.

BACKGROUND OF THE INVENTION

The trend of crimes committed through the use of firearms is ever increasing. In particular, banking institutions, convenience store markets, fast-food restaurants and grocery stores are experiencing a dramatic growth in the number of firearm related burglaries and robberies.

To combat this wave of crime, several systems have been developed. One such system employs a "panic" switch which may be activated during a robbery or burglary. With such a system, a person must physically enable a switch in an emergency situation in order to alert a monitoring station as to the emergency. This type of system has several drawbacks. First, the person subject to the emergency must be within reaching distance of the switch in order to activate it. Otherwise, the system is rendered useless. Second, the person must be in a position to activate the switch without arousing suspicion in a typical robbery/burglary situation. In the event that a person is restrained, activation of the switch may not be possible. Third, the person attempting to activate the switch may be put in additional danger by possibly alerting signal the perpetrator of a crime to the activation of an alarm. Fourth, the switch may be accidentally enabled, causing false alarms which in turn cause further delays to the reaction time of monitoring stations.

Monitoring cameras have also been installed in many locations to combat these types of crimes. While these devices may aid in the apprehension of a perpetrator at some later date, they do little to warn authorities of a crime while it is in progress.

Studies show that an increasing number of crimes are occurring using a "takeover" type of tactic. In these types of crimes, an armed perpetrator fires an attention or warning shot in order to cause fear as well as to demand attention from the victims of the crime.

Many types of devices currently exist to detect gunshots, such as described in U.S. Pat. No. 3,936,822 to Hirschberg (the '822 patent) and U.S. Pat. No. 3,341,810 to Wallen, Jr. (the '810 patent), both of which are incorporated herein by reference.

The '822 patent describes a method and apparatus for detecting weapon fire by examining the propagation velocities of the resultant waves emitted after the discharge of a weapon. In order to properly operate, the device must be located a fixed distance from the muzzle of the weapon being fired.

The '810 patent describes a gunshot detector system capable of indicating the position and range of a projectile discharged from a firearm. The '810 device operates on the principle that certain wave sources in propagating through a medium have their high frequency components attenuated more than their low frequency components.

Both the '822 and '810 patents operate by measuring and examining the acoustic sound waves emitted from the discharge of the firearm. Unfortunately, these sound waves may become distorted as they travel from the source of the emission to the detection device. As a result, the information detected may be inaccurate, resulting in a "false" signal. Further, the '822 device must be located in close proximity to the discharge source in order to effectively operate, making it impractical as a device to defend against crime.

Thus, there is a continuing need in the art for a device capable of detecting the discharge of a firearm in an accurate and efficient manner.

There is a further need in the art for a firearm discharge detection device capable of transmitting an alerting signal to a predetermined location as to the discharge in order for aid to be dispatched to the location.

There is still a further need in the art for a firearm discharge detection device capable of detecting crime while it is in progress.

There is an additional need in the art for a firearm discharge detection device which creates no additional danger to the to a user of the device.

SUMMARY OF THE INVENTION

The present invention solves significant problems in the art by providing a method and apparatus for detecting the discharge of a firearm and transmitting an alerting signal to a predetermined location. Generally described, the present invention provides an apparatus for detecting the discharge of a firearm and transmitting an alerting signal to a predetermined location having detection circuitry comprising: (1) a microphone for detecting pre-set sensitivity levels, (2) a measuring means for measuring acoustic energy generated from the discharge of the firearm, resulting in acoustic energy information, (3) transferring means for transferring the acoustic energy information to a digital signal processor, which converts the acoustic energy information into digital format, resulting in digitized binary codes, (4) an analyzing means for comparing the digitized binary codes contained in the digital signal processor with a set of predetermined criteria, (5) a verification process, and (6) an alerting means for transmitting an alerting signal to a predetermined location in the event the digitized binary codes match the set of predetermined criteria.

In the preferred embodiment of the present invention, the microphone is a piezo electric microphone and is adjustable for sensitivity to limit or increase the range of detection.

In an alternative embodiment of the present invention, the acoustic energy measuring means includes, but is not limited to, means to measure sound decibel level, duration, frequency, pitch, tone, and pressure level from the discharge of the firearm.

In another alternative embodiment of the present invention, the analyzing means includes the digital signal processor and a first integrated circuit chip wherein the digitized binary codes are compared to predetermined criteria contained within the first integrated circuit chip.

In another alternative embodiment of the present invention, the verification process either confirms or denies a match between the digitized binary codes contained within the digital signal processor and the predetermined criteria contained within the first integrated circuit chip within predetermined parameters. Further, the first integrated circuit chip effectuates a second integrated circuit chip in the event the verification process confirms a match between the digitized binary codes contained within the digital signal processor and the predetermined criteria contained within the first integrated circuit chip within predetermined parameters. The second integrated circuit chip then initiates the alerting means for transmitting an alerting signal to the predetermined location in the event the verification process confirms a match between the digitized binary codes contained within the digital signal processor and the predetermined criteria contained within the first integrated circuit chip within predetermined parameters and activates a third integrated circuit chip. The third integrated circuit chip then transmits a pre-programmed audio message containing pertinent information including location, operating hours, and notification of the discharge of the firearm for a predetermined duration for a predetermined number of cycles. Also, the detection circuitry is reset in the event the verification process denies a match between the digitized binary codes contained within the digital signal processor and the predetermined criteria contained within the first integrated circuit chip within predetermined parameters, or the predetermined number of cycles has ended.

In another alternative embodiment of the present invention, the predetermined location includes an alarm monitoring station capable of having an alarm circuit board able to ascertain the location of the alerting means. The alerting means further includes an alarming means which may be silent, audible, visual, or any combination thereof.

The alerting means utilizes technologies selected from standard telephone communications, radio frequency communications, cellular data telephone communications, satellite communications, or any combination thereof.

In another alternative embodiment of the present invention, the detection circuitry and alerting means can be independent of any existing alarm system or incorporated within an existing alarm system.

In another alternative embodiment of the present invention, the detection circuitry and alerting means initiates an audio recorder, video recorder, automatic door or window locking mechanism, exterior audible alarm, still picture camera, or any combination thereof. A battery is also provided in the event of a power failure in order to maintain system integrity.

Accordingly, it is an object of the present invention to provide a device capable of detecting the discharge of a firearm in an accurate and efficient manner.

It is another object of the invention to provide for a firearm discharge detection device capable of transmitting an alerting signal to a predetermined location as to the discharge in order for aid to be dispatched to the location.

It is another object of the invention for a firearm discharge detection device which detects crime while it is in progress.

It is yet another object of the invention which creates no additional danger to a user of the device.

Accordingly, it is a feature of the invention to differentiate between the actual discharge of a firearm and a false alarm.

It is another feature of the invention to transmit a pre-programmed message containing pertinent information to notify a predetermined location as to a discharge of a firearm.

These and other objects of the present invention may be better understood and appreciated from the following detailed description of the embodiments thereof, selected for the purposes of illustration and shown in the accompanying drawings.

DETAILED DESCRIPTION OF A PREFERRED EMBODIMENT

Figure 1:
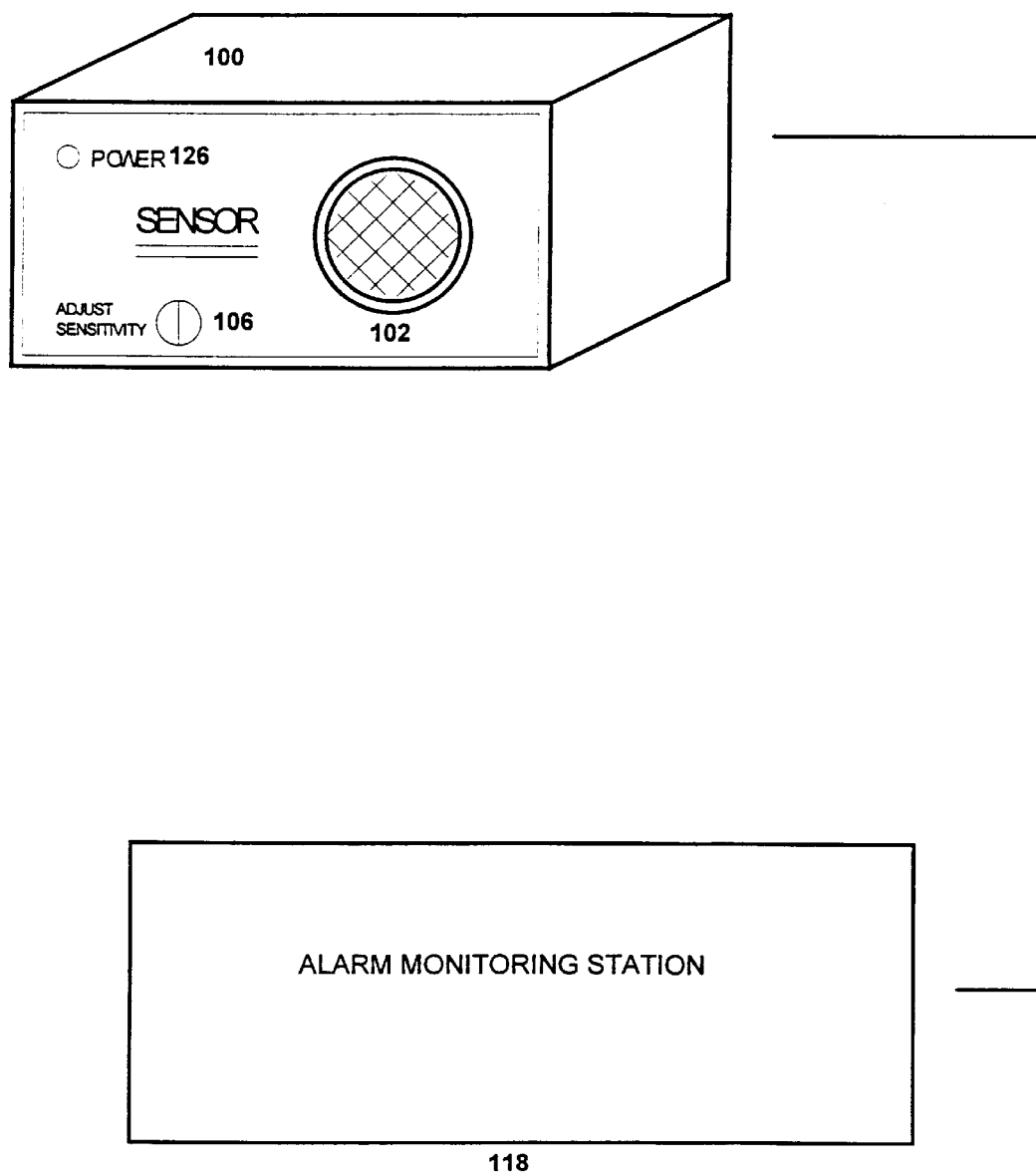
FIG. 1 is a flowchart depicting the detection system and monitoring station in a preferred embodiment of the present invention.

Referring initially to FIG. 1 of the drawings, in which like numerals indicate like elements throughout the several views, a general overview depicting the detection system and monitoring station of the preferred embodiment of the invention is shown. The external portion of a detection system 100 is generally shown having a power signal indicator 126, a microphone 102, and a microphone adjuster 106 allowing a user to manually adjust the sensitivity of the detection system 100. Through the use of a communications device 116, the detection system 100 is able to communicate with an alarm monitoring station 118.

Figure 2:
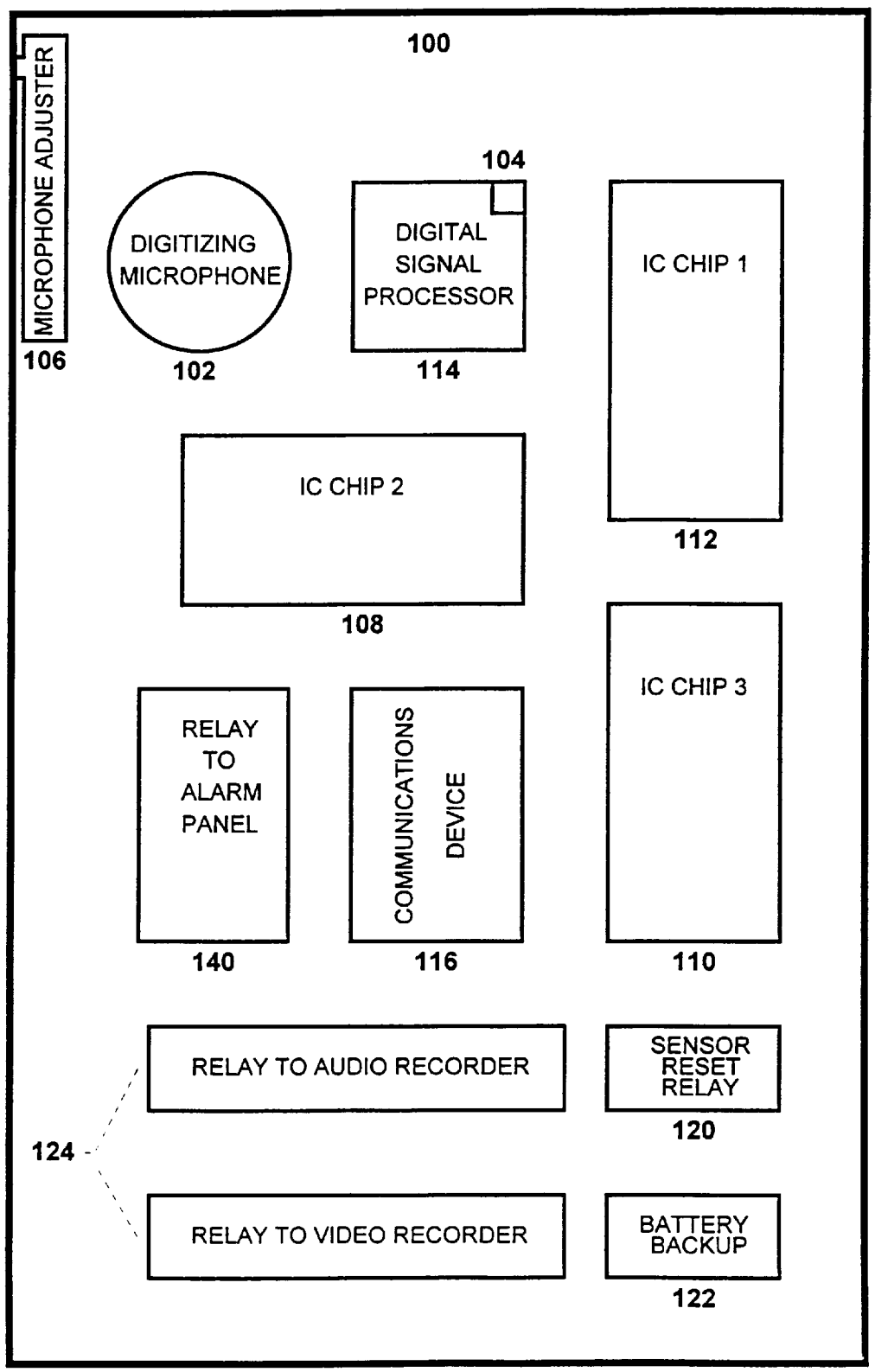
FIG. 2 is a circuit diagram of the apparatus for detecting the discharge of a firearm in a preferred embodiment of the present invention.

Turning next to FIG. 2, a circuit diagram of the apparatus for detecting the discharge of a firearm in a preferred embodiment of the present invention is generally shown. The invention comprises a detection system 100 having the microphone 102 capable of detecting acoustic energy generated form the discharge of a firearm resulting in acoustic energy information. The detection system 100 may be independent of or incorporated into an existing alarm system. In a preferred embodiment of the invention, a piezo electric microphone is employed. The microphone 102 measures primarily sound decibel level, duration, frequency, pitch, tone and pressure level form the discharge of a firearm. The acoustic energy information is next transferred to a digital signal processor 114 where it is converted into a digital format resulting in digitized binary codes 104. The microphone 102 is adjustable through the microphone adjuster 106 for sensitivity to limit or increase its range of detection.

The digitized binary codes 104 are next analyzed with predetermined criteria contained within a first integrated circuit chip 112. If a verification match is determined after comparing the digitized binary codes 104 and predetermined criteria, a second integrated circuit chip 108 is effectuated.

The second integrated circuit chip 108 transmits an alerting signal to a predetermined location such as an alarm monitoring station 118 through a communications device 116. It is understood to one skilled in the art that virtually any type of communication device 116 can be employed including, but not limited to, a standard telephone communications line, radio frequency (RF) communications, cellular data telephone communications, satellite communications, or a combination thereof.

The second integrated circuit chip 108 further effectuates a third integrated circuit chip 110 which transmits a pre-recorded message containing pertinent information including, but not limited to, location, operating hours, and notification of the discharge of a firearm to the alarm monitoring station 118. Once the message is transmitted for a predetermined number of cycles, the third integrated circuit chip 110 is reset through a relay 120 which in turn resets the detection system 100. The third integrated circuit chip 110 is also reset in the event that no match is found between the digitized binary codes and the set of predetermined criteria.

A battery 122 is included in the event of power disruption to maintain system integrity. A number of monitoring devices including, but not limited to, an audio recorder, video recorder, automatic door or window locking mechanism, exterior audible alarm, still picture camera or any combination thereof can be activated through relays 124. A relay 140 activates an alarm which may be silent, audible, visual or any combination thereof.

Figure 3:
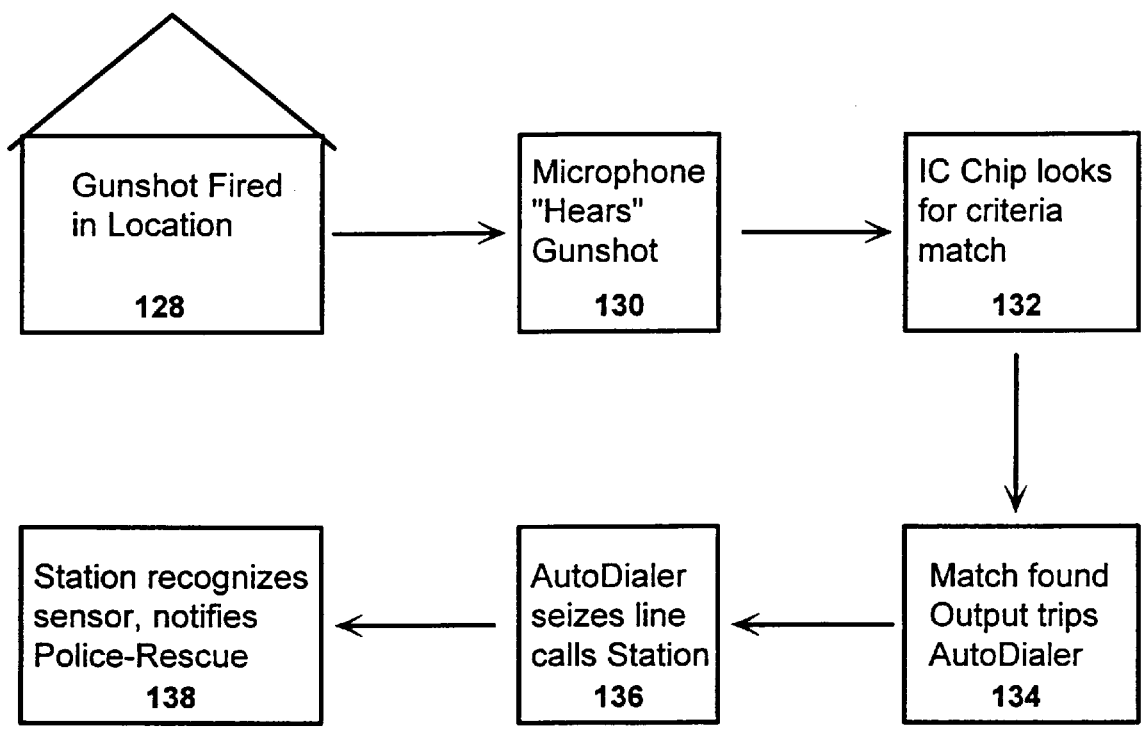
FIG. 3 is a flowchart depicting a typical operation of the detection system in a preferred embodiment of the present invention.

Turning next to FIG. 3, a flowchart depicting normal operation of the detection system in a preferred embodiment of the present invention is shown. Typically, a firearm is discharged 128 within range of the detection system 100 as shown. The microphone 102 detects the discharge 130 and the sound is converted to digitized binary code 104 through the digital signal processor 114. The digitized binary code 104 is next sent to the first integrated circuit chip 112 where it is compared against a set of predetermined criteria 132. A verification process is then initiated in which, if a match between the digitized binary code 104 and the set of predetermined criteria 134 is found, the second integrated circuit chip 108 is powered, an auto-dial sequence 136 is initiated, and a pre-recorded message contained on third integrated circuit chip 110 is initiated. The alarm monitoring station 118 is subsequently notified. The alarm monitoring station 118 is equipped with an alarm circuit board capable of ascertaining the location of the detection system 100 through any process well known to one skilled in the art. If no match is found, the detection system 100 is reset and the process begins anew.

Accordingly, it will be understood that the preferred embodiment of the present invention has been disclosed by way of example and that other modifications and alterations may occur to those skilled in the art without departing from the scope and spirit of the appended claims.

What is claimed is:

1. An apparatus for detecting the discharge of a firearm and transmitting an alerting signal to a predetermined location comprising:

detection circuitry comprising:
   a microphone for detecting pre-set sensitivity levels;
   acoustic energy measuring means for measuring acoustic energy generated from the discharge of said firearm resulting in acoustic energy information, wherein said acoustic energy measuring means measures sound decibel level, duration, frequency, pitch, tone, and pressure level from said discharge of said firearm;
   transferring means for transferring said acoustic energy information to a digital signal processor, wherein said acoustic energy information is converted into digital format resulting in digitized binary codes;
   and an analyzing means for comparing said digitized binary codes contained in said digital signal processor with a set of predetermined criteria;
   a verification process; and
   an alerting means for transmitting an alerting signal to a predetermined location when said digitized binary codes match said set of predetermined criteria.

2. The apparatus of claim 1, wherein said microphone is a piezo electric microphone.

3. The apparatus of claim 1, wherein said microphone is adjustable for sensitivity to limit or increase the range of detection.

4. The apparatus of claim 1, wherein said analyzing means comprises said digital signal processor and a first integrated circuit chip wherein said digitized binary codes are compared to predetermined criteria contained within said first integrated circuit chip.

5. The apparatus of claim 4, wherein said verification process either confirms or denies a match between said digitized binary codes contained within said digital signal processor and said predetermined criteria contained within said first integrated circuit chip within predetermined parameters.

6. The apparatus of claim 5, wherein said first integrated circuit chip effectuates a second integrated circuit chip in the event said verification process confirms a match between said digitized binary codes contained within said digital signal processor and said predetermined criteria contained within said first integrated circuit chip within predetermined parameters.

7. The apparatus of claim 6, wherein said second integrated circuit chip initiates said alerting means for transmitting an alerting signal to said predetermined location in the event said verification process confirms a match between said digitized binary codes contained within said digital signal processor and said predetermined criteria contained within said first integrated circuit chip within predetermined parameters and effectuates a third integrated circuit chip.

8. The apparatus of claim 7, wherein said third integrated circuit chip transmits a pre-programmed audio message containing pertinent information including location, operating hours, and notification of said discharge of said firearm for a predetermined duration for a predetermined number of cycles.

9. The apparatus of claim 8, wherein said detection circuitry is reset in the event said verification process denies a match between said digitized binary codes contained within said digital signal processor and said predetermined criteria contained within said first integrated circuit chip within predetermined parameters or said predetermined number of cycles has ended.

10. The apparatus of claim 1, wherein said predetermined location comprises an alarm monitoring station.

11. The apparatus of claim 10, wherein said alarm monitoring station comprises an alarm circuit board capable of ascertaining the location of said alerting means.

12. The apparatus of claim 1, wherein said apparatus further comprises an alarming means.

13. The apparatus of claim 12, wherein said alarming means is selected from the group consisting of silent, audible, visual, and any combination thereof.

14. The apparatus of claim 1, wherein said alerting means utilizes technologies selected from the group consisting of standard telephone communications, radio frequency communications, cellular data telephone communications, and satellite communications.

15. The apparatus of claim 1, wherein said detection circuitry and alerting means are independent of any existing alarm system.

16. The apparatus of claim 1, wherein said detection circuitry and alerting means are incorporated within an existing alarm system.

17. The apparatus of claim 1, wherein said detection circuitry and alerting means initiate an audio recorder, video recorder, automatic door or window locking mechanism, exterior audible alarm, still picture camera or any combination thereof.

18. The apparatus of claim 1, wherein said detection circuitry further comprises a battery.

19. An apparatus for detecting the discharge of a firearm and transmitting an alerting signal to a predetermined location comprising:

detection circuitry comprising:
   a piezo electric microphone for detecting pre-set sensitivity levels wherein said microphone is adjustable for sensitivity to limit or increase the range of detection;

a converting means for converting data collected from said microphone into digital format resulting in digitized binary codes, wherein said converting means further comprises:

means for measuring acoustic energy generated from the discharge of said firearm resulting in acoustic energy information, wherein said acoustic energy measuring means measures sound decibel level, duration, frequency, pitch, tone, and pressure level from said discharge of said firearm; and means for transferring said acoustic energy information to said digital signal processor for conversion into said digital format resulting in digitized binary codes;

a digital signal processor for receiving said digitized binary codes; and an analyzing means for comparing said digitized binary codes contained in said digital signal processor with a set of predetermined criteria, wherein said analyzing means comprises said digital signal processor and a first integrated circuit chip wherein said digitized binary codes are compared to predetermined criteria contained within said first integrated circuit chip;

a verification process which either confirms or denies a match between said digitized binary codes contained within said digital signal processor and said predetermined criteria contained within said first integrated circuit chip within predetermined parameters, wherein said first integrated circuit chip effectuates a second integrated circuit chip in the event said verification process confirms a match between said digitized binary codes contained within said digital signal processor and said predetermined criteria contained within said first integrated circuit chip within predetermined parameters, wherein second integrated circuit chip initiates said alerting means for alerting said predetermined location in the event said verification process confirms a match between said digitized binary codes contained within said digital signal processor and said predetermined criteria contained within said first integrated circuit chip within predetermined parameters and effectuates a third integrated circuit chip, wherein said third integrated circuit chip transmits a preprogrammed audio message containing pertinent information including location, operating hours, and notification of said discharge of said firearm for a predetermined duration for a predetermined number of cycles, wherein said detection circuitry is reset in the event said verification process denies a match between said digitized binary codes contained within said digital signal processor and said predetermined criteria contained within said first integrated circuit chip within predetermined parameters or said predetermined number of cycles has ended;

an alerting means for transmitting an alerting signal to a predetermined location in the event said digitized binary codes match said set of predetermined criteria, wherein said predetermined location comprises an alarm monitoring station further comprising an alarm circuit board capable of ascertaining the location of said alerting means, wherein said alerting means utilizes technologies selected from the group consisting of standard telephone communications, radio frequency communications, cellular data telephone communications, and satellite communications;

an alarming means selected from the group consisting of silent, audible, visual, and any combination thereof;

a battery; and wherein said detection circuitry and alerting means are independent of any existing alarm system or are incorporated within an existing alarm system, wherein said detection circuitry and alerting means initiate an audio recorder, video recorder, automatic door or window locking mechanism, exterior audible alarm, still picture camera or any combination thereof.

\* \* \* \* \*